United States Patent [19]

Linklater

[11] Patent Number: 4,925,435

[45] Date of Patent: May 15, 1990

[54] APPARATUS FOR WINDING AND UNWINDING WIRE

[76] Inventor: Peter G. Linklater, No 2 R.D., Owaka, New Zealand

[21] Appl. No.: 353,448

[22] Filed: May 17, 1989

[30] Foreign Application Priority Data

May 18, 1988 [NZ] New Zealand .................. 224691

[51] Int. Cl.$^5$ .............................................. F16H 7/08
[52] U.S. Cl. .................................. 474/101; 180/53.6; 242/86.5 R; 474/133
[58] Field of Search ................... 474/101, 133, 84–87, 474/69, 70; 242/86.5 R, 86.6, 94; 180/53.6

[56] References Cited

U.S. PATENT DOCUMENTS

| | | | |
|---|---|---|---|
| 2,759,683 | 8/1956 | Peterson | 242/86.6 |
| 3,934,655 | 1/1976 | Whistle | 242/86.5 R X |
| 4,775,114 | 10/1988 | Farnsworth | 242/86.5 R |

*Primary Examiner*—Thuy M. Bui
*Attorney, Agent, or Firm*—Zarley, McKee, Thomte, Voorhees & Sease

[57] ABSTRACT

An apparatus is provided for winding and unwinding wire. The apparatus, which is mounted upon a motor vehicle, includes a plurality of drive pulleys, each with a detachable reel. The drive belt extends around the pulleys and a drive wheel on the motor vehicle to provide driving power to the drive pulleys and the connected reels. The drive belt can be moved to a second position apart from the drive wheel of the vehicle so as to act as a brake for the drive pulleys and reels.

8 Claims, 2 Drawing Sheets

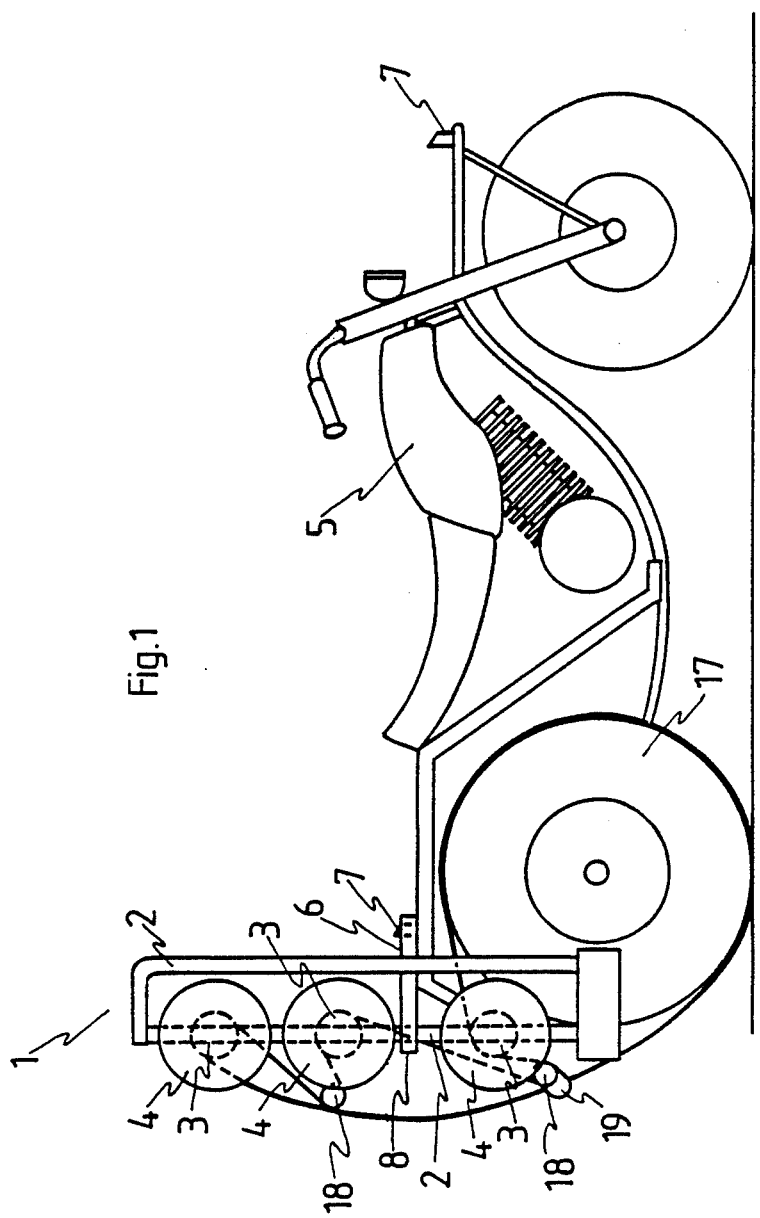

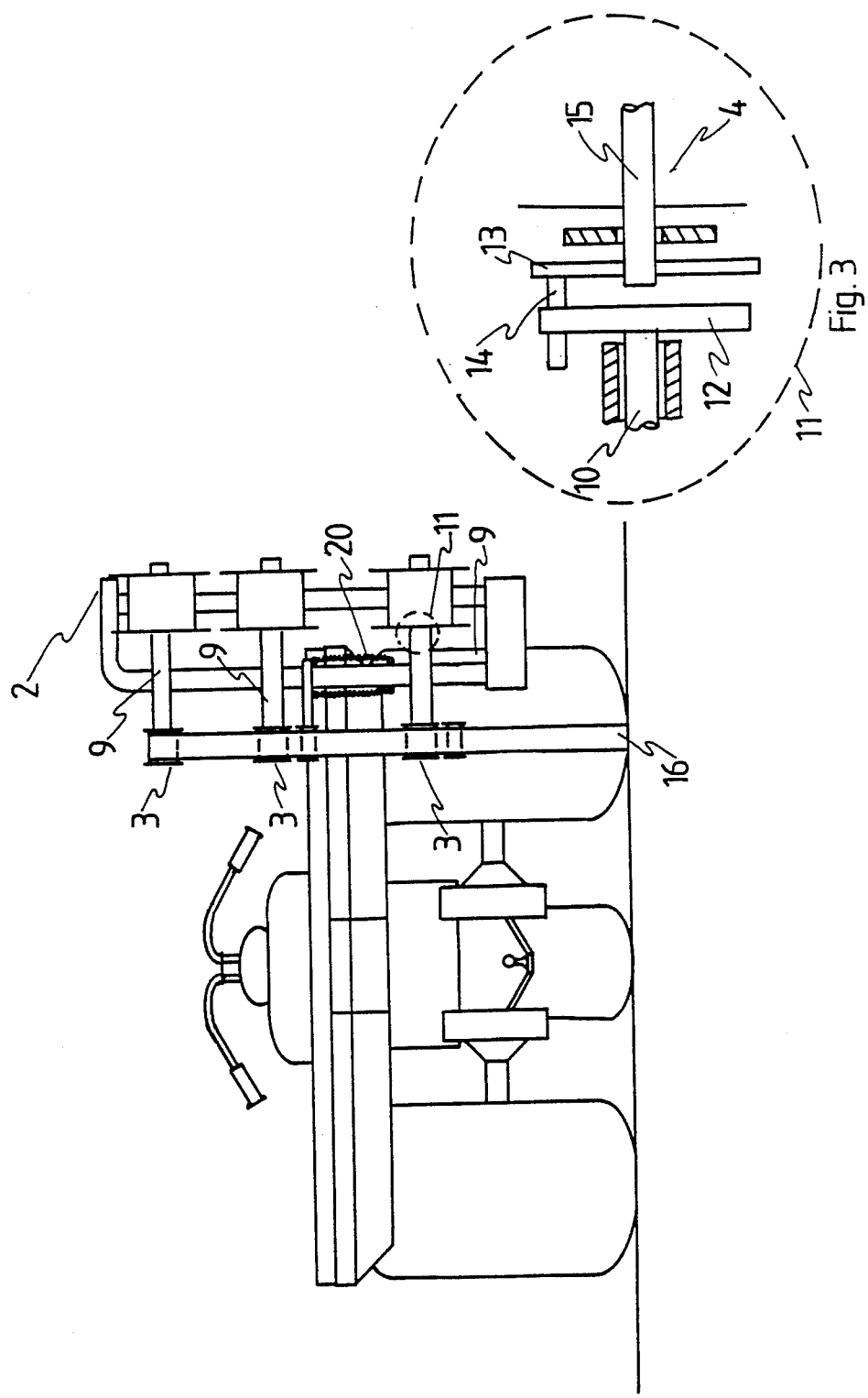

APPARATUS FOR WINDING AND UNWINDING WIRE

BACKGROUND OF THE INVENTION

The present invention relates to fencing, and in particular to apparatus for use in connection with a motorized vehicle to facilitate the simultaneous winding, or unwinding, of fence wire from a plurality reels.

It is common now for farmers to use three and four wheel all terrain motor cycles for rapid travelling about their property. The use of such motor cycles has greatly enhanced the ability of farmers to travel rapidly about their property. However, many of the day to day tasks still require the farmer to leave the cycle.

One of the regular and time consuming jobs carried out by farmers is the moving of electric break fencing.

It is an object of the present invention to provide apparatus of facilitate the erection and moving of break fencing.

SUMMARY OF THE INVENTION

Accordingly, in a broad aspect, the invention provides apparatus for mounting on a motorized vehicle comprising a plurality of drive pulleys, each drive pulley being removably connectable with mounting means for a detachable reel, an endless belt being provided to connect the drive pulleys, in one position the drive belt being positionable about the circumference of a driven wheel of the vehicle to provide a driving power to the drive pulleys, and to the reels associated with the drive pulleys, and in a second position, the belt being associated with retaining means separate from the driven wheel of the vehicle and arranged to act as an overrun brake to the drive pulleys and associated reels.

Desirably, at least one idler pulley is associated with the belt and is operable to maintain correct alignment of the belt. Conveniently, the drive pulleys and associated reels are arranged for mounting in a substantially vertical orientation.

Preferably, the drive reels are arranged in a mounting frame, the mounting frame comprising an adjustable clamp for fixing the frame to a motorized vehicle whilst permitting adjustment of the frame relative to the vehicle.

In a preferred arrangement, belt tensioning springs are associated with the adjustable clamp to enable the application of a constant tension to the drive belt.

A mounting bracket may be provided for mounting the apparatus on a vehicle and, such a mounting bracket may be provided for mounting the apparatus at the front or the rear of the vehicle.

Conveniently, each reel may be associated with a drive pulley by way of a releasable connector, any selected numbers of reels being associated with a corresponding drive pulley without any modification of the apparatus.

BRIEF DESCRIPTION OF THE DRAWINGS

In order that the invention may be more readily understood, and so that further features thereof may be appreciated, an embodiment of the apparatus will now be described, by way of example, with reference to the accompanying drawings, in which:

FIG. 1 is a side elevational view illustrating an apparatus of the invention mounted to a 3-wheel motor cycle;

FIG. 2 is a rear end elevation of the apparatus of FIG. 1; and

FIG. 3 illustrates, in detail, a drive coupling for use in the apparatus of FIG. 1.

DESCRIPTION OF THE PREFERRED EMBODIMENT

Referring to FIG. 1, a fence winding apparatus is generally indicated at 1. The apparatus 1 comprises a mounting frame 2 supporting a plurality (in this case three) of drive pulleys 3 which are coupled, in a manner to be described in greater detail herein below, to wire reels 4. The frame 2 is mountable on a motor vehicle, in this case a 3-wheel motor cycle 5 via a clamp 6 which cooperates with mounting pin 7 on the vehicle. A mounting pin 7 is conveniently provided at each end of the vehicle so that the apparatus of 1 can be mounted either at the rear or at the front of the vehicle. The frame 2 is mounted slidingly at one end 8 of the clamp 6 and is lockable in a desired position relative thereto. This arrangement allows for up and down and rotational adjustment of the frame and associated elements.

The drive pulleys, and associated reels, are mounted in the frame 2 in spaced apart positions and arranged in a substantially vertical manner.

Referring now, in particular, to FIG. 2, a drive shaft 9 for each drive pulley 3 is rotatably mounted at appropriate positions in the frame 2. A bearing assembly (not shown) for each drive shaft is incorporated into the frame 2. The shafts 9 are fixed against longitudinal movement relative to the frame and a drive pulley 3 is fixedly mounted at one end of each drive shaft. The drive pulleys 3 are mounted in a common plane, substantially parallel to the frame 2 to facilitate mounting of a drive belt 16, as will be described further herein below. A drive coupling 11, best seen in FIG. 3, is formed at the end 10 of each drive shaft 9 opposite to the drive pulley 3, the drive coupling 11 enabling detachable mounting of a reel 4 to a respective drive shaft 9.

Each drive coupling 11 comprises a drive plate 12 associated with the end 10 of the shaft 9 which cooperates with a driven plate 13 via a driving element 14. An axle member 15 is fixedly located in the ribbon plate 13 for mounting of a reel 3. The element 14 is releasable received in the drive plate 12 to allow ready removal of the reel 3 and associated coupling elements.

Turning again to FIGS. 1 and 2, the drive belt 16 is threaded around the drive pulleys 3, and, in one arrangement, around a wheel 17 of the vehicle. Idler pulleys 18 are provided to maintain alignment of the belt 16 and to ensure that the belt is maintained in operative frictional contact with the drive pulleys 3. The belt 16 is preferably of a rubber or other elastomeric material. A belt of about 25 mm width has been found to be suitable.

In this arrangement of the belt 16, forward, or rearward movement of the vehicle drives the belt, which in turn drives the draft pulleys 3 and, hence, the reels 4.

With this arrangement, the winding of three strands of wire can be effected simultaneously as the cycle is moved. As explained above, drive to the three spaced apart wire reels is provided via the endless belt 16. As the motor cycle moves forwards, the belt 16 grips the tyre of the wheel 17 to provide simultaneous frictional drive to each of the drive pulleys 3 and hence simultaneous driving of the reels 4.

Each reel 4 is provided with a self compensating speed capability depending upon the amount of wire on the reel at any given time. To achieve this, the belt is driven slightly faster than is necessary to allow for self compensation of each pulley.

As the reels 4 can be mounted and removed independently, the same apparatus can be used for one, two or three reels as required. It will be appreciated that any suitable number of reels can be used. For example, set of up to 5 reels have been found to work reliably.

By removing the belt 16 from its position about the wheel 17 the apparatus can be used for free winding out of wire from the apparatus. In this arrangement, the belt 16 is mounted on a support hook and held in a position in which the belt can function as an overrun brake to maintain the reels 4 with sufficient tension during a winding out operation to prevent tangling or overrunning of the reels.

A belt keeper 19 is provided on the lowermost one of the idler pulleys 18 to retain the belt in position over the wheel 17 of the vehicle.

Additionally, to ensure that the belt 16 is maintained under the desired tension, a spring mounting unit 20 may be used to connect the frame 2 with the mounting bracket 6.

Apparatus of the invention has been found suitable for a wide variety of applications both in the assembly and dismantling of wire fence on farms. The apparatus may also be readily adapted for in parks, reserves, golf courses and playing and sports fields, etc., for cordoning off certain areas, for example from pedestrian and vehicular traffic. The ability of the apparatus to both facilitate assembly and dismantling of fences makes it ideally suited for fencing operations that are intended to be only temporary structures.

It will also be appreciated that only minor modifications would permit the apparatus to be mounted on a variety of vehicles. Thus, for example in sports grounds and golf courses where a grass cutting tractor is available the apparatus could be arranged to be driven by such a vehicle.

It will be appreciated that various modifications and changes may be made to this apparatus without departing from the scope of the present invention.

I claim:

1. Apparatus for mounting on a vehicle comprising a plurality of drive pulleys, each drive pulley being removably connectable with mounting means for a detachable reel, an endless belt being provided to connect the drive pulleys, in one position the drive belt being positionable about the circumference of a driven wheel of the vehicle to provide a driving power to the drive pulleys, and to the reels associated with the drive pulleys.

2. Apparatus according to claim 1, wherein, in a second position, the belt is received on retaining means separate from the driven wheel of the vehicle and arranged to act as an overrun brake to the drive pulleys and associated reels.

3. Apparatus according to claim 1, wherein at least one idler pulley is associated with the belt and is operable to maintain correct alignment of the belt.

4. Apparatus according to claim 1, wherein the drive pulleys and associated reels are arranged for mounting in a substantially vertical orientation.

5. Apparatus according to claim 1, wherein the drive reels are arranged in a mounting frame, the mounting frame comprising an adjustable clamp for fixing the frame to a motorized vehicle whilst permitting adjustment of the frame relative to the vehicle.

6. Apparatus according to claim 1, wherein belt tensioning springs are associated with the adjustable clamp to enable the application of a constant tension to the drive belt.

7. Apparatus according to claim 1, wherein a mounting bracket is provided for mounting the apparatus on a vehicle and, such a mounting bracket may be provided for mounting the apparatus at the front or the rear of the vehicle.

8. Apparatus according to claim 1, wherein each reel is associated with a drive pulley by way of a releasable connector, any selected numbers of reels being associated with a corresponding drive pulley.

* * * * *